(12) United States Patent
Sun et al.

(10) Patent No.: US 10,538,169 B2
(45) Date of Patent: Jan. 21, 2020

(54) MOTOR OPERATING REGION BASED RANDOM PULSE WIDTH MODULATION

(71) Applicant: Ford Global Technologies, LLC, Dearborn, MI (US)

(72) Inventors: Xuemei Sun, Canton, MI (US); Jami J. Miller, Canton, MI (US); Christopher Wolf, Ann Arbor, MI (US); Liqun Na, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/997,532

(22) Filed: Jun. 4, 2018

(65) Prior Publication Data

US 2019/0366854 A1    Dec. 5, 2019

(51) Int. Cl.
| | | |
|---|---|---|
| B60L 15/20 | (2006.01) | |
| H02P 27/08 | (2006.01) | |
| B60L 15/02 | (2006.01) | |
| B60L 50/16 | (2019.01) | |
| H02M 7/5387 | (2007.01) | |

(52) U.S. Cl.
CPC ............ B60L 15/20 (2013.01); B60L 15/02 (2013.01); B60L 50/16 (2019.02); H02P 27/085 (2013.01); *B60L 2210/40* (2013.01); *B60L 2240/421* (2013.01); *H02M 7/53875* (2013.01)

(58) Field of Classification Search
None
See application file for complete search history.

(56) References Cited

U.S. PATENT DOCUMENTS

| | | | |
|---|---|---|---|
| 6,870,347 B2 * | 3/2005 | Mizuno | H02P 6/34 318/722 |
| 8,138,712 B2 | 3/2012 | Yamada | |
| 8,174,221 B2 | 5/2012 | Kaneko et al. | |
| 8,289,033 B2 * | 10/2012 | Kajouke | G01R 31/2837 324/633 |
| 8,405,341 B2 | 3/2013 | Tagome | |
| 2011/0156621 A1 * | 6/2011 | Schaefer-Enkeler | B60L 7/06 318/380 |
| 2011/0316460 A1 * | 12/2011 | Yasuoka | H02H 7/0805 318/400.22 |
| 2013/0200828 A1 * | 8/2013 | Miller | H02M 1/44 318/400.23 |
| 2014/0063673 A1 * | 3/2014 | Kagawa | H02H 9/007 361/113 |
| 2018/0067086 A1 * | 3/2018 | Tian | G01N 29/42 |
| 2018/0076744 A1 * | 3/2018 | Wolf | H02P 6/10 |

* cited by examiner

*Primary Examiner* — Bentsu Ro
(74) *Attorney, Agent, or Firm* — David B. Kelley; Brooks Kushman P.C.

(57) ABSTRACT

A vehicle includes a traction motor having resonance frequency zones, an inverter including switches arranged to drive the traction motor, and a controller. The controller operates the switches only within specified sets of carrier frequencies such that noise side bands corresponding to the carrier frequencies fall outside the resonance frequency zones.

18 Claims, 6 Drawing Sheets
(4 of 6 Drawing Sheet(s) Filed in Color)

MOTOR OPERATING REGION BASED RANDOM PULSE WIDTH MODULATION

TECHNICAL FIELD

This disclosure relates to the control of automotive vehicle electric motors.

BACKGROUND

Hybrid-electric vehicles (HEVs) and battery electric vehicles (BEVs) may rely on a traction battery to power a traction motor for propulsion, and a power inverter there between to convert direct current (DC) power to alternating current (AC) power. The typical AC traction motor is a three-phase motor powered by three sinusoidal signals each driven with 120 degrees phase separation but other configurations are also possible.

While the use of traction motors in hybrid vehicles can improve fuel economy and emissions performance relative to conventional internal combustion engine vehicles, they may generate unwanted noise. One source of noise springs from the pulse width modulation (PWM) of switched power converters. Although the PWM carrier frequency can be varied such that narrow-band noise is converted to lower magnitude wide-band noise, this may increase the likelihood of resultant electromechanical torques/forces exciting system resonant frequencies, which may lead to momentary increases in acoustic emissions.

SUMMARY

A vehicle includes a traction motor, an inverter including switches arranged to drive the traction motor, and a controller. The controller operates the switches only within specified sets of carrier frequencies such that noise side bands corresponding to the carrier frequencies fall outside resonance frequency zones of the traction motor.

A vehicle control system includes a controller that operates switches of an inverter arranged to drive a traction motor only within specified sets of carrier frequencies that depend on a speed of the traction motor such that noise side bands corresponding to the carrier frequencies fall outside resonance frequency zones of the traction motor.

A method for operating a traction motor includes operating, by a controller, switches of an inverter arranged to drive the traction motor only within specified sets of carrier frequencies that depend on speed of the traction motor such that noise side bands corresponding to the carrier frequencies fall outside resonance frequency zones of the traction motor.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
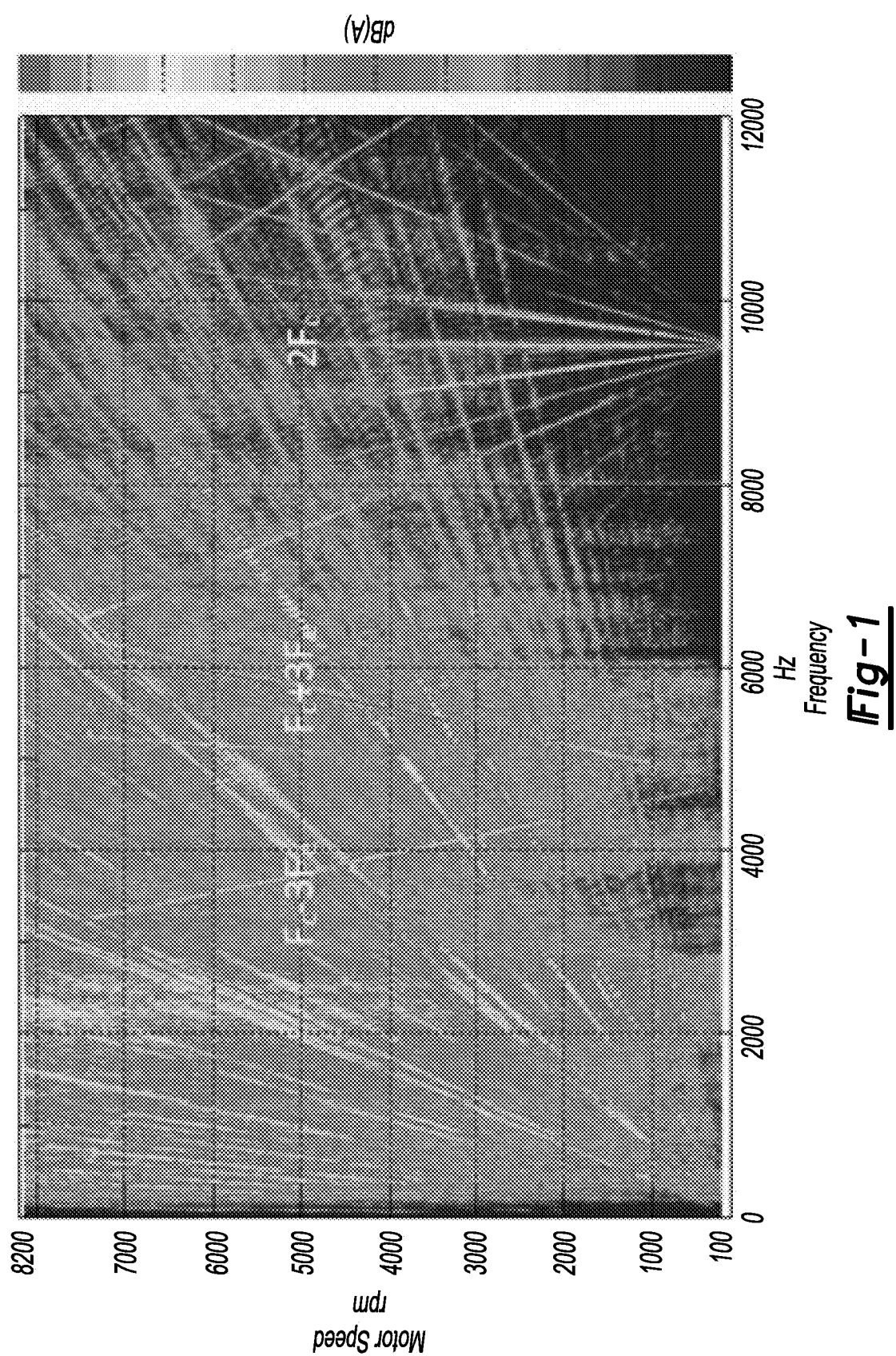
FIG. 1 is a plot revealing acoustic noise dominant frequencies (motor speed versus frequency).

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

INTRODUCTION

Acoustic noise emitted by traction motors brings new challenges. One source of acoustic noise comes from the electro-magnetic interaction when the motor is powered by a pulse width modulated (PWM) or square wave. A common method to reduce noise is to vary the PWM carrier frequency such that the narrowband noise is converted to broadband. (Random PWM (RPWM) is popularly used because of its simplicity in implementation.) The problem is the wide range of the frequency domain may excite the system resonant frequencies increasing the acoustic noise and vibration.

High PWM carrier frequencies, inaudible to the human ear, could be used to avoid resonance frequencies and reduce the acoustic noise. The high carrier frequencies, however, may not be feasible because of the inverter hardware heating limit, inverter switching loss, and electro-motive interference issues. Here, motor operating region based RPWM is proposed for resonant frequency avoidance and system performance improvement.

Acoustic Noise Sideband Frequency

This section describes the acoustic noise sideband frequencies, which is further applied to select PWM carrier frequencies for resonance avoidance in later sections. For a converter-fed power supply with PWM control, the dominant electric harmonic of the 3-phase line to line voltage or 3-phase current, $f_k$, can be expressed as $$f_k = f_c \pm (2 \times n) \times f_e \quad (1)$$

$$f_k = 2 * f_c \pm (2 \times m - 1) \times f_e \quad (2)$$

where n=1, 2 and m=1, 3. The harmonic at m=2 is cancelled out in the balanced 3 phase line to line voltage. $f_c$ is the PWM converter carrier frequency, and $f_e$ is the modulated signal fundamental frequency calculated as $$f_e = (\text{Motor Speed [rpm]})/60 \times \text{Pole Pairs} \quad (3)$$

where the Pole Pair in this example is equal to 4.

The spectra of the sum of the instantaneous volt-amps for all motor phases is an analog for the acoustic emissions spectra. The spectra can be determined via well-established analytical and simulation techniques. Using these methods, the most significant frequency components at each potential motor speed can be identified.

$$\text{Power} = i_a * u_a + i_b * u_b + i_c * u_c = i_b * u_{ba} + i_c * u_{ca} \quad (4)$$

where Power is the input power to the motor, $i_i$ is phase current, $u_i$ is phase voltage, and $u_{ij}$ is line to line voltage.

From Eq. (1), the dominant frequency component of the Power or acoustic emission is formed from the current fundamental frequency and voltage $2^{nd}$ harmonics, or the voltage fundamental frequency and current $2^{nd}$ harmonics. Therefore, the dominant acoustic noise frequency, $f_n$, is $$f_n = f_c \pm (3 \times f_e) \quad (5)$$

From Eq (2), the dominant acoustic noise frequency is $$f_n = 2 \times f_c \quad (6)$$

Eqs (5) and (6) were validated using the Interior Permanent Magnet Synchronous Machine (IPMSM) with 4 pole pairs, as shown in FIG. 1. A PWM with fixed carrier frequency of 4.75 kHz was used, and the motor was operated at 50 Nm with speed ramping from 0 to 8000 rpm.

Region Based RPWM

A novel region based RPWM scheme can be developed in which the operating range of motor speed and torque is divided into multiple regions. Each region is assigned a set of carrier frequencies. A possible advantage of using the motor operating region based RPWM technique is to achieve optimized design as there is no interaction between the different regions in the motor speed and torque operating map. RPWM refers to any kind of random PWM, such as discrete random PWM, continuous random PWM, pseudo-random PWM, etc.

Figure 2:
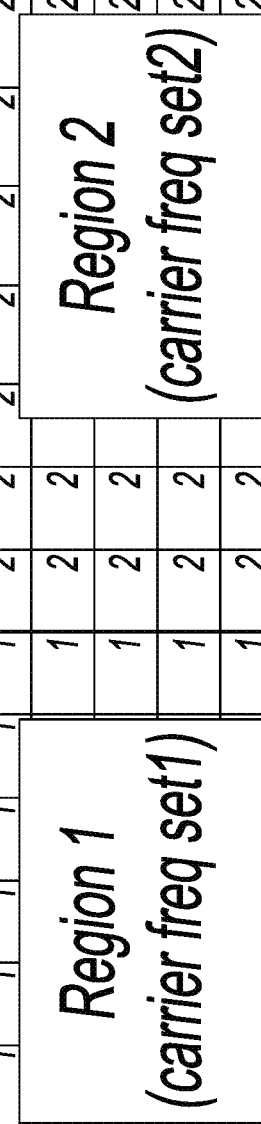
FIG. 2 is a table showing an example of operating region based Random PWM (RPWM) design.

FIG. 2 illustrates a motor operating region based RPWM design, where cell contents (1, 2) stand for motor operating regions containing a PWM carrier frequency set ($f_{c1i}$ and $f_{c2i}$). For example, for discrete RPWM or pseudo RPWM, region 1 contains carrier frequencies of 3 kHz, 3.51 kHz, 4.2 kHz, and region 2 contains carrier frequencies of 4.9 kHz, 5.5 kHz, 6.2 kHz. For continuous RPWM, region 1 contains carrier frequencies of (3.6 kHz+rand( ))×1 kHz, and region 2 contains carrier frequencies of (5 kHz+rand( ))×0.75 kHz, where rand( ) generates a random number from −1 to 1.

Carrier Frequency Selection for Resonance Avoidance

Figure 3:
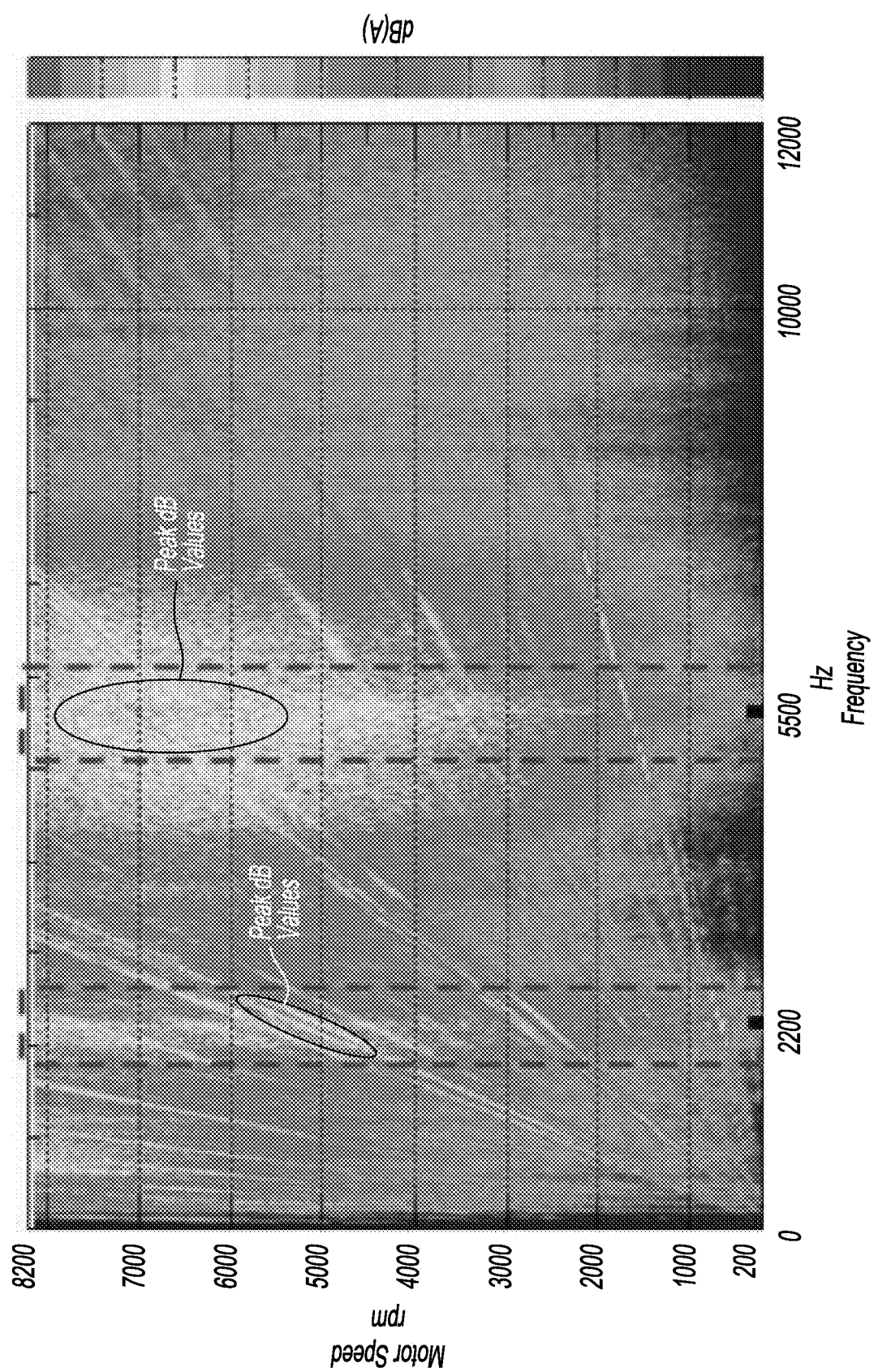
FIG. 3 is a plot showing examples of system resonance frequency (motor speed versus frequency).

The structural resonances of the power train and/or vehicle can be detected by injecting a large wide-band current (such as a swept sine or random signal) via a power converter and measuring the vibration and/or acoustic emissions. In a different approach, a spectral analysis of the measured vibration and/or sound will reveal frequencies with an increased response to the excitation. Such an analysis is shown in FIG. 3, where RPWM with Carrier Frequency 4.75 kHz+/−2 kHz is applied and the motor is operated at 50 Nm with speed ramping from 0 to 8000 rpm. Two resonance frequency zones are identified around the peak dB values present at 2.2 kHz and 5.5 kHz. The frequency values that define the boundaries (indicated by heavy dashed vertical lines) encompass a ±10% drop in dB around the peak dB values. Of course, other boundary frequency values can be used as design requirements dictate. For example, the boundary values could be identified as a percentage difference (e.g., 15%) of the frequencies corresponding to the peak dB values, etc.

As shown in Eqs. (5) and (6), the dominant acoustic noise frequencies are a function of motor speed and the PWM carrier frequencies. To avoid exciting the switching noise, the PWM carrier frequencies are chosen such that the noise side bands, NSB, do not fall into the resonance frequency zones:

$$NSB = f_{ci} \pm 3 * f_e \quad (7)$$

Figure 4A:
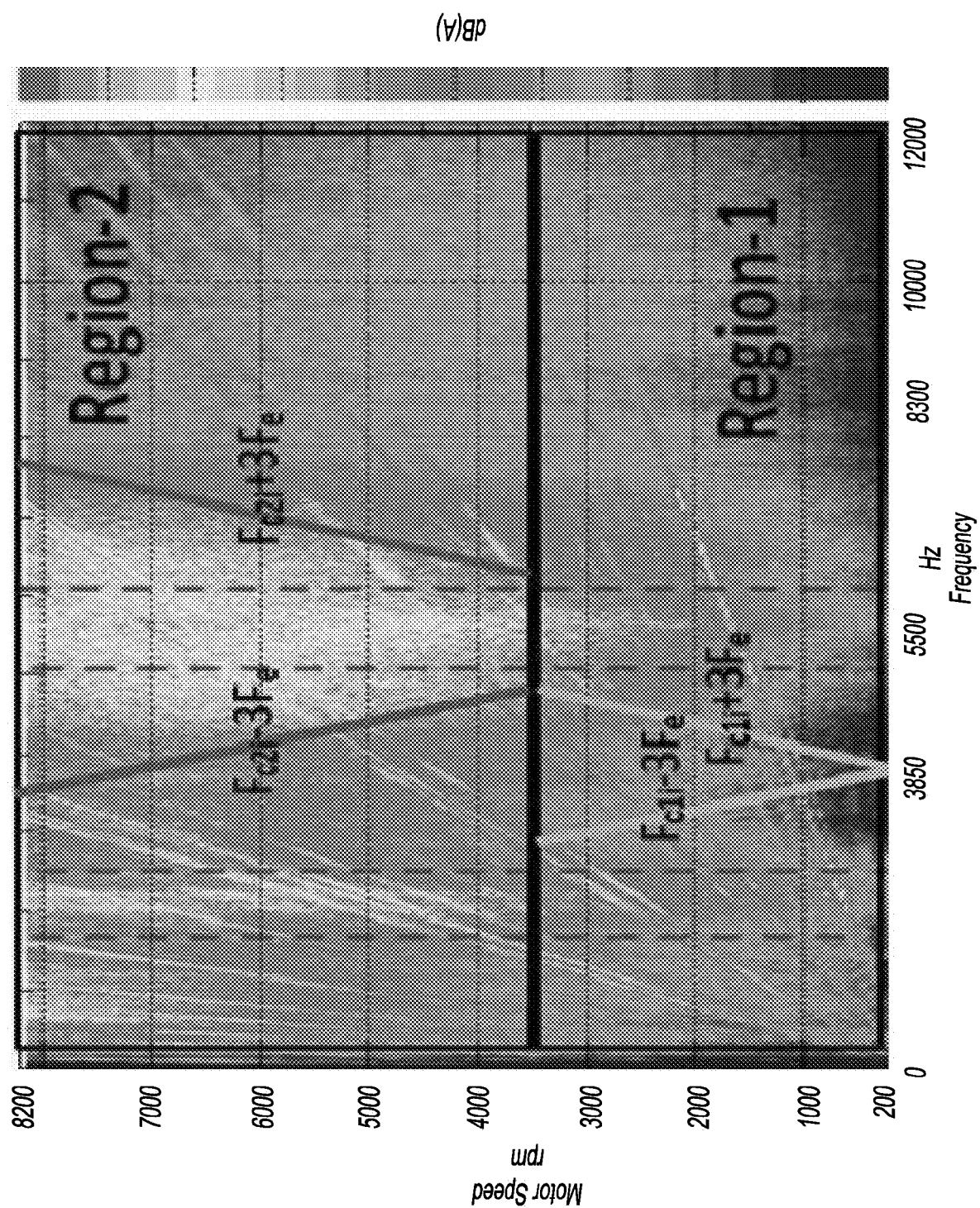
FIGS. 4A and 4B are plots showing examples of operating region based RPWM design for resonance avoidance.
Figure 4B:
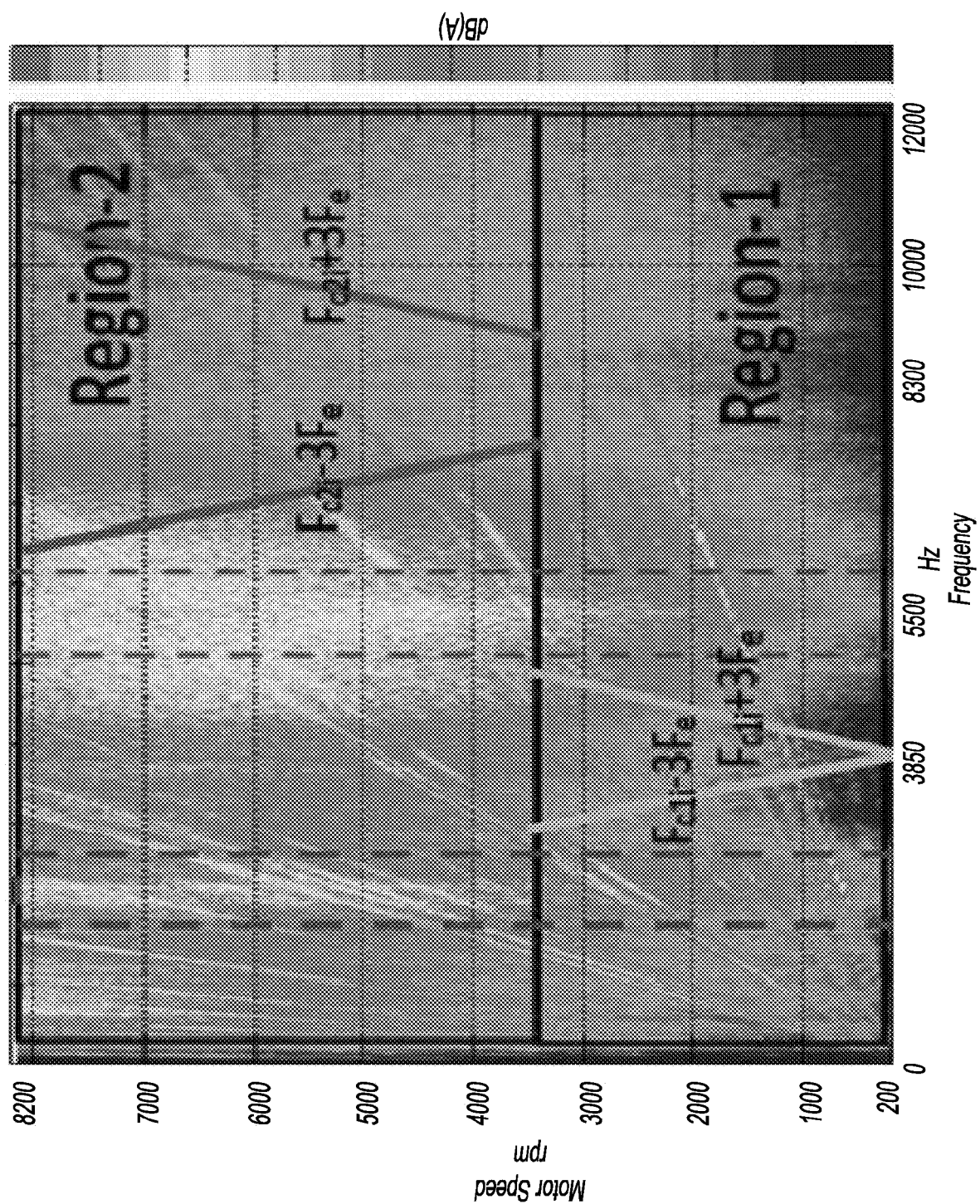

FIGS. 4A and 4B illustrate the method of carrier frequency selection, where two regions are selected based on the motor speed. The carrier frequency $f_{c1i}$ and $f_{c2i}$ are selected such that the noise sidebands ($f_{c1i} \pm 3 * f_e$ and $f_{c2i} \pm 3 * f_e$) do not fall into the resonance zones identified by heavy dashed vertical line to avoid amplifying the acoustic noise. At region 1, the smaller carrier frequency is chosen to reduce switching loss. In region 2, FIG. 4A favors switching loss reduction and 4B favors harmonics reduction.

Eq. (7) reveals that the noise side bands associated with carrier frequencies around 3.85 kHz will avoid the structural resonance zones for motor speeds less than approximately 3500 rpm. Because $f_e$ increases as motor speed increases according to Eq. (3), the noise side bands will encounter the two structural resonance zones for motor speeds greater than approximately 3500 rpm. Hence, the motor speed in this example separating region 1 from region 2 is selected to be 3500 rpm. A lower motor speed could be selected depending on the desired separation between the noise side bands and structural resonance zones. For example, one may specify that there be at least 300 Hz between the boundary of a structural resonance zone and the maximum value for the corresponding noise side band, etc.

Eq. (7) also reveals that the noise side bands associated with carrier frequencies around 5.5 kHz and 8.3 kHz will avoid the structural resonance zones for motor speeds greater than approximately 3500 rpm. That is in the example of FIGS. 4A and 4B, carrier frequencies at which switches of the inverter driving the motor will be around 3.85 kHz for motor speeds less than 3500 rpm, and will be around 5.5 kHz or 8.3 kHz for motor speeds greater than 3500 rpm.

In summary, a novel region based RPWM scheme has been proposed in which the motor torque and speed operating map is divided into multiple regions, and optimal PWM carrier frequencies are selected at each region to achieve system optimization such as resonance avoidance, fuel economy improvement, inverter heating reduction, and electromagnetic interference reduction. Furthermore, the acoustic switching noise frequency is derived and the PWM carrier frequency selection method is proposed to avoid exciting the vehicle system structural resonances.

Figure 5:
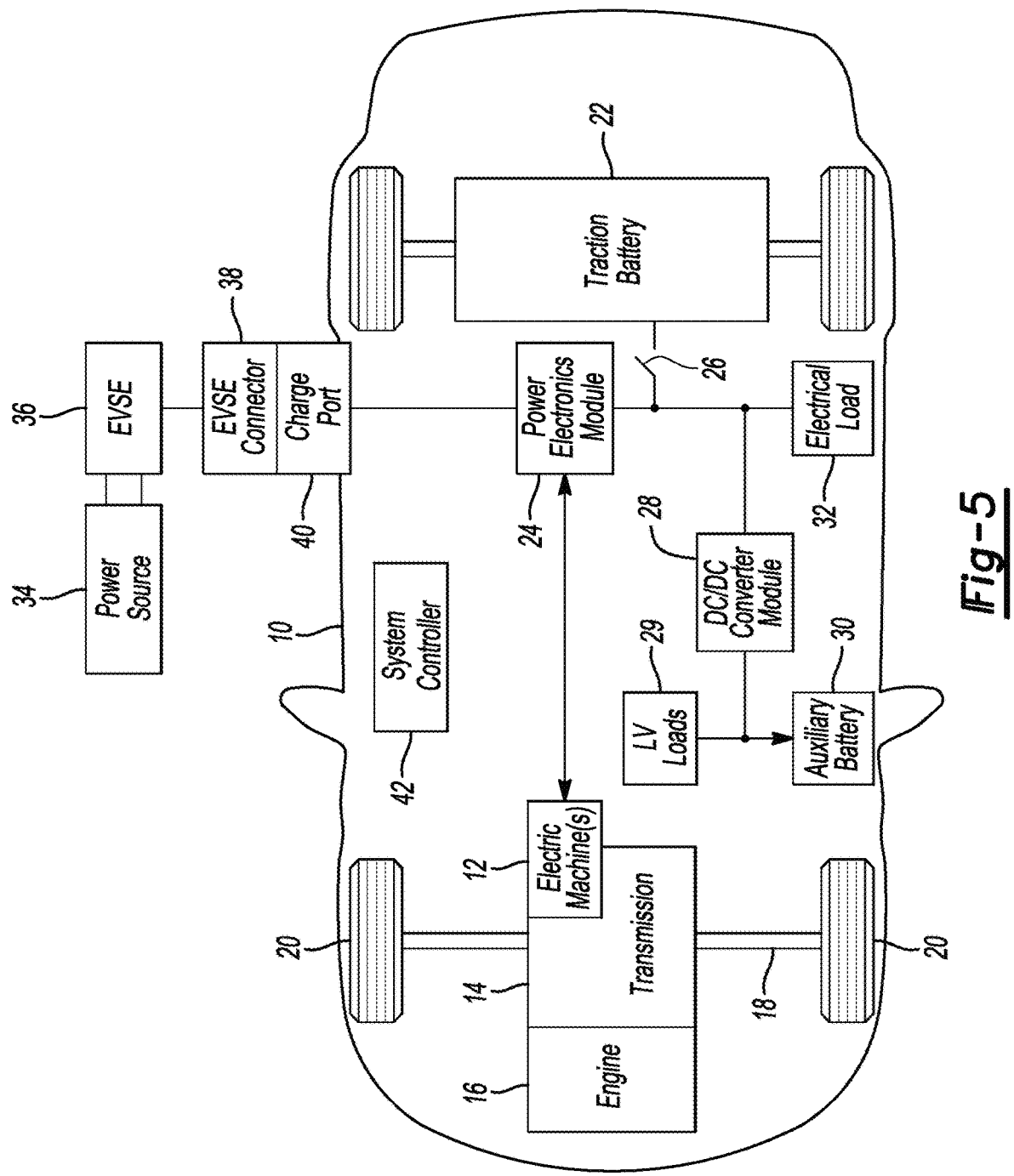
FIG. 5 is a schematic diagram of a vehicle.

The control techniques discussed above may be implemented within modules of a vehicle. FIG. 5, for example, depicts an electrified vehicle 10 with such modules. The electrified vehicle 10 includes one or more electric machines 12 mechanically coupled to a hybrid transmission 14. The electric machines 12 may operate as a motor or generator. In addition, the hybrid transmission 14 is mechanically coupled to an engine 16 and a drive shaft 18 that is mechanically coupled to the wheels 20.

A traction battery or battery pack 22 stores energy that can be used by the electric machines 12. The vehicle battery pack 22 may provide a high voltage direct current (DC) output. The traction battery 22 may be electrically coupled to one or more power electronics modules 24. One or more contactors 26 may further isolate the traction battery 22 from other components when opened and connect the traction battery 22 to other components when closed. The power electronics module 24 includes an inverter with switches arranged to drive the electric machines 12 with power from the traction battery 22. Thus, the power electronics module 24 provides the ability to bi-directionally transfer energy between the traction battery 22 and the electric machines 12. For example, the traction battery 22 may provide a DC voltage while the electric machines 12 may operate with alternating current (AC) to function. The power electronics module 24 may convert the DC voltage to AC current to operate the electric machines 12. In regenerative mode, the power electronics module 24 may convert the AC current from the electric machines 12 acting as generators to DC voltage compatible with the traction battery 22.

The vehicle 10 may include a variable-voltage converter (VVC) (not shown) electrically coupled between the traction battery 22 and power electronics module 24. The VVC may be a DC/DC boost converter configured to increase or boost the voltage provided by the traction battery 22. By increasing the voltage, current requirements may be decreased leading to a reduction in wiring size for the power electronics module 24 and the electric machines 12. Further, the electric machines 12 may be operated with better efficiency and lower losses.

In addition to providing energy for propulsion, the traction battery 22 may provide energy for other vehicle electrical systems. The vehicle 10 may include a DC/DC converter module 40 that converts the high voltage DC output of the traction battery 22 to a low voltage DC supply that is compatible with low-voltage vehicle loads 29. An output of the DC/DC converter module 28 may be electrically coupled to an auxiliary battery 30 (e.g., 12V battery) for charging the auxiliary battery 30. The low-voltage systems may be electrically coupled to the auxiliary battery 30. One or more electrical loads 32 may be coupled to the high-voltage bus. The electrical loads 32 may have an associated controller that operates and controls the electrical loads 32 when appropriate. Examples of electrical loads 32 may include a fan, an electric heating element, and/or an air-conditioning compressor.

The electrified vehicle 10 may, in certain configurations, be configured to recharge the traction battery 22 from an external power source 34. The external power source 34 may be a connection to an electrical outlet. The external power source 34 may be electrically coupled to a charger or electric vehicle supply equipment (EVSE) 36. The external power source 34 may be an electrical power distribution network or grid as provided by an electric utility company. The EVSE 36 may provide circuitry and controls to regulate and manage the transfer of energy between the power source 34 and the vehicle 10. The external power source 34 may provide DC or AC electric power to the EVSE 36. The EVSE 36 may have a charge connector 38 for plugging into a charge port 40 of the vehicle 10. The charge port 40 may be any type of port configured to transfer power from the EVSE 36 to the vehicle 10. The EVSE connector 38 may have pins that mate with corresponding recesses of the charge port 40. Alternatively, various components described as being electrically coupled or connected may transfer power using a wireless inductive coupling.

In some configurations, the electrified vehicle 10 may be configured to provide power to an external load. For example, the electrified vehicle may be configured to operate as a back-up generator or power outlet. In such applications, a load may be connected to the EVSE connector 38 or other outlet. The electrified vehicle 10 may be configured to return power to the power source 34. For example, the electrified vehicle 10 may be configured to provide alternating current (AC) power to the electrical grid. The voltage supplied by the electrified vehicle may be synchronized to the power line.

Electronic modules in the vehicle 10 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown but it may be implied that the vehicle network may connect to any electronic module that is present in the vehicle 10. A vehicle system controller (VSC) 42 may be present to coordinate operation of the various components.

The vehicle 10 also includes the DC/DC converter module 28 for converting the voltage of the high-voltage bus to a voltage level suitable for the auxiliary battery 30 and low-voltage loads 29 (e.g., around 12 Volts). The vehicle 10 may further include additional switches, contactors, and circuitry to selectively select power flow between the traction battery 22 to the DC/DC converter 28.

The one or more controllers 42 may be in communication with and or command the various modules of the vehicle 10, including the power electronics module 24. Hence the one or more controllers 42 may command switches of the inverter of the power electronic module 24 to operate at carrier frequencies around 3.85 kHz for motor speeds less than 3500 rpm, and to operate at carrier frequencies around 5.5 kHz or 8.3 kHz for motor speeds greater than 3500 rpm to avoid noisy operation.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction motor having resonance frequency zones;
an inverter including switches arranged to drive the traction motor; and
a controller configured to operate the switches only within specified sets of carrier frequencies such that noise side bands corresponding to the carrier frequencies fall outside the resonance frequency zones and at least one of the carrier frequencies falls within one of the resonance frequency zones.

2. The vehicle of claim 1, wherein the specified sets depend on speed of the traction motor.

3. The vehicle of claim 1, wherein at least some of the carrier frequencies fall within the resonance frequency zones.

4. The vehicle of claim 1, wherein frequencies of the noise side bands change as speed of the traction motor changes.

5. The vehicle of claim 1, wherein frequencies of the noise side bands are a function of speed of the traction motor.

6. The vehicle of claim 1, wherein frequencies of the noise side bands are defined by a modulated signal fundamental frequency.

7. The vehicle of claim 6, wherein the modulated signal fundamental frequency is a function of speed of the traction motor.

8. A vehicle control system comprising:
a controller configured to operate switches of an inverter arranged to drive a traction motor only within specified sets of carrier frequencies that depend on a speed of the traction motor such that noise side bands corresponding to the carrier frequencies fall outside resonance frequency zones of the traction motor and at least one of the carrier frequencies falls within one of the resonance frequency zones.

9. The vehicle control system of claim 8, wherein at least some of the carrier frequencies fall within the resonance frequency zones.

10. The vehicle control system of claim 8, wherein frequencies of the noise side bands change as speed of the traction motor changes.

11. The vehicle control system of claim 8, wherein frequencies of the noise side bands are a function of speed of the traction motor.

12. The vehicle control system of 8, wherein frequencies of the noise side bands are defined by a modulated signal fundamental frequency.

13. A method for operating a traction motor, having resonance frequency zones, comprising:
by a controller, operating switches of an inverter arranged to drive the traction motor only within specified sets of carrier frequencies that depend on speed of the traction motor such that noise side bands corresponding to the carrier frequencies fall outside the resonance frequency zones and at least one of the carrier frequencies falls within one of the resonance frequency zones.

14. The method of claim 13, wherein at least some of the carrier frequencies fall within the resonance frequency zones.

15. The method of claim 13, wherein frequencies of the noise side bands change as speed of the traction motor changes.

16. The method of claim 13, wherein frequencies of the noise side bands are a function of speed of the traction motor.

17. The method of claim 13, wherein frequencies of the noise side bands are defined by a modulated signal fundamental frequency.

18. The method of claim 17, wherein the modulated signal fundamental frequency is a function of speed of the traction motor.

* * * * *